Sept. 13, 1955 E. LATTA 2,717,518
DIRECTION-SENSITIVE LINKAGE-LENGTHENING ARRANGEMENT
PARTICULARLY FOR USE IN DEPRESSED PARKING
OF WINDSHIELD WIPERS
Filed Oct. 5, 1953 3 Sheets-Sheet 1
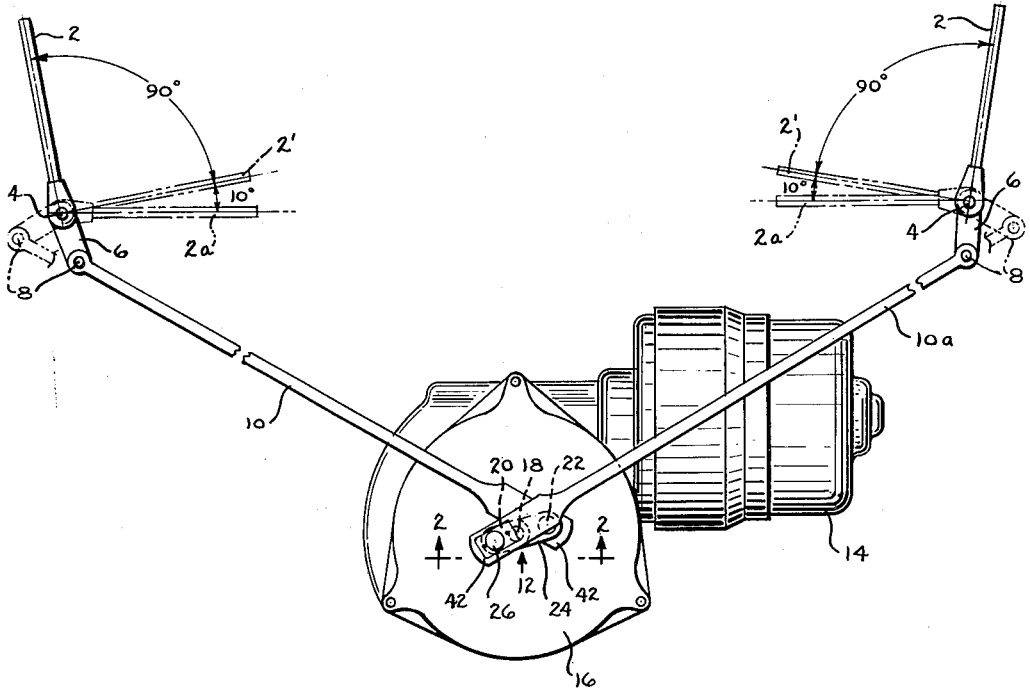
FIG.1
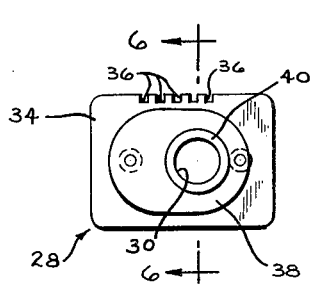 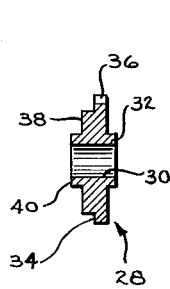 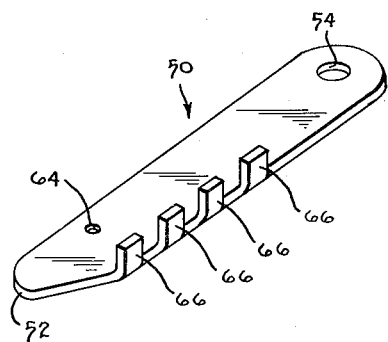
FIG.5    FIG.6    FIG.7
*INVENTOR.*
EDWARD LATTA
BY James and Franklin
ATTORNEY

*INVENTOR.*
EDWARD LATTA
BY James and Franklin
ATTORNEY

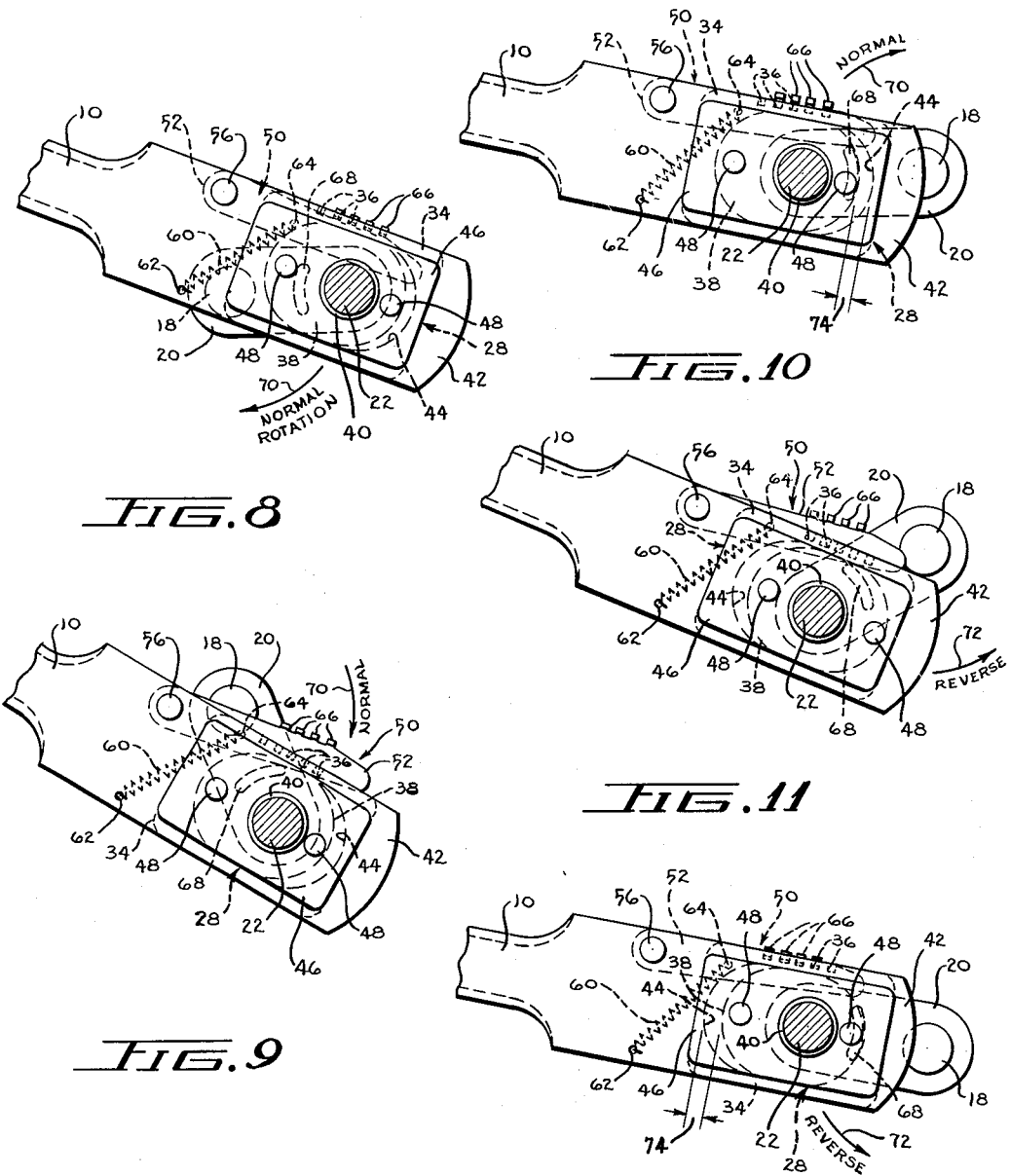

United States Patent Office 2,717,518
Patented Sept. 13, 1955

2,717,518

DIRECTION-SENSITIVE LINKAGE - LENGTHENING ARRANGEMENT, PARTICULARLY FOR USE IN DEPRESSED PARKING OF WINDSHIELD WIPERS

Edward Latta, Owosso, Mich., assignor to Redmond Company, Inc., Owosso, Mich., a corporation of Michigan Application October 5, 1953, Serial No. 383,962

16 Claims. (Cl. 74—75)

The present invention relates to a linkage-lengthening arrangement for use in a linkage to be selectively driven in opposite directions, the length of one portion of the linkage varying in an automatic manner depending upon the direction in which the linkage is driven. The invention is particularly adapted for use in conjunction with electric-motor driven windshield wiper systems.

When windshield wiper blades are oscillated over the windshield in order to wipe rain or the like therefrom, it is of the essence of their function that they be oscillated over that area of the windshield through which the driver and passengers look. However, when the windshield wiper is not in use it is desired that the blades be parked or stopped in such a position as not to interfere with the vision of the driver and passengers, and preferably substantially flush against the edge of the windshield and beyond their normal range of oscillation. With pneumatically operated windshield wipers the attainment of this result is not difficult. However, with electric motor driven windshield wipers serious difficulties arise to prevent the attainment of this objective. One approach is to provide mechanism by means of which rotation of the motor in one direction will cause the windshield wiper blades to oscillate and clean the windshield and rotation of the motor in the opposite direction will bring into action a cam-controlled switch or the like which will shut off the motor and thus cause the blades to stop when the blades are at the lowest point in their cycle of operation. However, this alone does not produce depressed parking, with the blades at positions below their normal arcs of travel.

It has been proposed to achieve depressed parking by providing in the wiper-actuating linkage a direction-sensitive arrangement which will automatically vary the effective length of one of the linkage members depending upon the direction in which the linkage is driven, the linkage member usually normally havings its shorter length during normal operation of the wiper and its longer length when the wiper is driven in the opposite direction to its parked position. The devices of the prior art which attempted to accomplish this purpose are either extremely complex or else non-positive in operation. In some cases friction is exclusively relied upon to actuate the linkage-lengthening arrangement. This has not only proved to be unreliable, but also renders the mechanism extremely susceptible to wear, an exceedingly important factor when it is considered that windshield wiper mechanisms should be capable of operating for the life of the automobile in which they are installed without requiring adjustment or repair if they are to be competitive with pneumatically operated windshield wipers.

I have devised a structure in which the linkage lengthening arrangement is much more positive in operation than comparable prior art devices by reason of the fact that the operative member of the linkage-lengthening arrangement functions in a "lost motion" manner and is moved from its position corresponding to normal operation to its position corresponding to parking of the blades through a direct mechanical connection and without having to rely upon friction. Insofar as operation of the wiper in one direction or the other is concerned, there is only one moving part, a catch which is engageable with the "lost motion" member and active to hold it in a position corresponding to the direction of operation of the wiper whenever forces are exerted thereupon which tend to move it away from that position. The arrangement of parts is such that the catch is disengaged from the "lost motion" member during a portion of each cycle of operation of the wiper, but at a time when the forces exerted thereon tend to retain it in its proper position. When, however, the direction of operation of the wiper is reversed, the catch is disengaged from the "lost motion" member at a time when the forces active upon it are in the opposite direction, tending to move it to its new position corresponding to the new direction of operation of the wiper. Once that member is pushed to its new position it will remain therein for so long as the wiper continues to operate in its new direction. Thus, during operation of the wiper in any direction, the operative connection between the motor and the wiper blades is direct, with no relative movement of driving parts taking place other than the relative pivoting of crank arms and connecting links which would occur even in the absence of a linkage-lengthening arrangement. The structure is so designed that even if the catch should break or become inoperative, the blades would still be operated by the motor in a uniform manner, although they would not always be swung through their normal arcs of travel.

The linkage between the driving motor and the wiper blades includes a pair of pivotally connected elements, such as a crank arm element or its equivalent and a link element or the like connected thereto. The pivotal connection between the elements includes a member mounted on and slidable with respect to one of the elements, that member being pivotally connected to the other of the elements so that, as the crank arm rotates, the member will tend to slide back and forth within its limits of movement during each cycle of operation. A catch is provided engageable with the member so as to hold it in either of its extreme positions. The catch is cyclically disengaged from the member by means of an operative connection with the other element, such disengagement occurring over not substantially more than half of each cycle of operation. When the wiper is operating in a normal direction the catch will be disengaged from the member during that part of the cycle in which the forces exerted on the member tend to cause it to assume its extreme position corresponding to normal operation, the catch engaging the member and holding it in position when the forces exerted thereupon tend to slide it from that position. When the direction of operation of the wiper is reversed, the forces active on the member tending to cause it to slide will also be reversed, and hence the catch will be disengaged from the member whenever forces are exerted thereupon which will cause the member to slide to its other extreme position. The first time that this occurs after the direction of rotation of the system has been reversed, the member will slide to its new position, which will normally be one in which the effective length of either the crank arm or the connecting link, and preferably the latter, will be increased. Thereafter the system will function as before, and no further relative movement between the member and the element on which it is slidably mounted will take place until the direction of rotation of the wiper is again reversed so as to resume its initial direction of rotation.

Should the catch malfunction so as always to be engaged with the member, the driving linkage will operate in either direction in a positive manner, but the linkage-lengthening effect will not be present. Should the catch malfunction so as not to engage with the member at the proper time, the blades will still be operated but with some lost motion existing within the operating linkage, by reason of which the angular extent of the throw of the blades will be slightly decreased. In any event, however, a defect in the linkage-lengthening arrangement will not cause a complete breakdown in the windshield wiper drive, nor erratic operation thereof.

To the accomplishment of the above, and to such other objects as may hereinafter appear, the present invention relates to a direction-sensitive linkage-lengthening arrangement and to the windshield wiper operating system in which it is used, as defined in the appended claims and as described in this specification, taken together with the following drawings in which:

Fig. 1 is an idealized view of a windshield wiper system incorporating the present invention;

Fig. 5 is a top plan view of the slidable member incorporated in the linkage;

Fig. 6 is a cross sectional view thereof taken along the line 6—6 of Fig. 5;

Fig. 7 is a three-quarter perspective view of the catch employed in the present invention;

Figs. 8, 9 and 10 are schematic representations showing the positions which various of the parts assume at different stages of movement of the linkage in a normal direction; and Figs. 11 and 12 are similar schematic representations of the positions which the parts assume when the linkage is driven in reverse direction for parking purposes.

Figure 3:
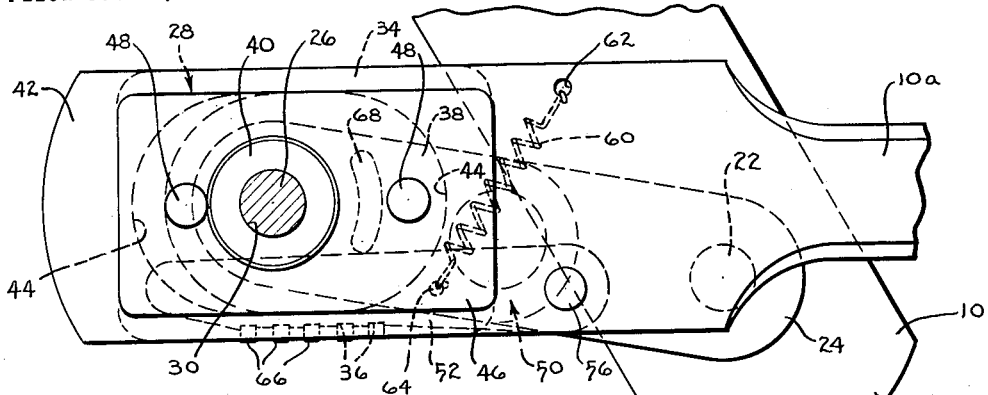
Fig. 3 is a top plan view taken along the line 3—3 of Fig. 2.

As is customary, a pair of windshield wiper blades 2 are pivotally mounted at 4 so as to be oscillatable over the windshield which they are to clean, the blades 2 being operatively connected to arms 6 pivotally connected at 8 to connecting links 10 and 10a which are in turn pivotally connected, in a manner subsequently to be described in detail, to a double crank assembly generally designated 12 driven by a motor 14 through a gear train in housing 16, the latter containing various control instrumentalities, and in particular a known type of position- and direction-sensitive switch effective, when the motor 14 is being rotated in a reverse direction for parking of the blades 2, to stop the motor 14 when the blades are in their lowermost position, as indicated by the reference numeral 2a in Fig. 1. Under normal circumstances the blades 2 are oscillated through an arc between the positions 2 and 2', that arc being here shown as approximately 90 degrees. When the blades are to be parked they are caused to oscillate to the position 2a, angularly depressed beyond the position 2' by a distance which is here illustrated as approximately 10 degrees. In order to accomplish this result the effective length of the connecting links 10 and 10a with respect to the crank arms of the double crank assembly 12 to which they are respectively connected must be increased. Reference to Figs. 2–7 will disclose the manner in which the connecting links 10 and 10a are connected to the double crank assembly in order to accomplish that end.

The crank assembly 12 comprises a crank shaft 18 rotated by the motor 14 and to which crank arm arm 20 is secured. A pin 22 extends up from the crank arm 20 at a point displaced from the axis of the shaft 18, is made fast to the crank arm 20, and supports at its upper end a second crank arm 24, the latter being fast on the pin 22 and extending out to the other side of the crank shaft 18 from the pin 22, there carrying a pin 26 which extends up therefrom.

Resting on the upper surfaces of the crank arms 20 and 24 are members constituting an assembly generally designated 28 (see Figs. 5 and 6). These members are vertically apertured at 30, the pins 22 and 26 respectively passing therethrough and being freely pivotal therein. The assembly 28 is defined by a lower hub 32 adapted to rest upon the upper surface of the crank arm 20 or 24, a plate-like portion 34 one side edge of which is serrated at 36 to define a plurality of teeth, an upper oval portion 38, and a top hub 40. If desired, the entire assembly 28 may be made in one piece, and is preferably molded from some plastic material such as nylon.

Each of the connecting links 10 and 10a has a flattened portion 42 overlying the end of the crank arm 20 or 24 to which it is connected, and that link portion 42 is provided with an elongated slot 44 within which the oval portion 38 of the assembly 28 is received, the slot 44 extending substantially in the direction of the length of the links 10 and 10a, having a width closely the same as the width of the member portion 38 but less than the width of the member portion 34, and having a length longer than the length of the member portions 38, the member portions 38 thus having a degree of slidable freedom within their respective slots 44 in the direction of the length of those slots. In order to retain the assembly 28 in position, plates 46 are positioned on top of the link portions 42, the upper member hubs 40 passing therethrough, the plates 46 being larger than the slots 44 and being secured to the assembly 28 by means of rivets or the like 48. The crank arm 24 rests on top of the upper hub 40 of the lower of the assembly 28 and the pin 26 which passes through the central aperture 30 of the upper of the upper of the assembly 28 is secured over the top thereof.

Each of the links 10 and 10a is provided with a catch generally designated 50 and defined by a finger-like body portion 52 apertured at one end at 54 so as to be pivotally mounted on stud 56 secured to the connecting link 10 or 10a at a point outwardly disposed with respect to the slot 44. A retaining washer 58 serves to hold the finger 52 on the stud at 56. A tension spring 60 has one end secured to aperture 62 in the link 10 or 10a and has its other end secured to aperture 64 in the catch finger 52, thus tending to cause the catch 50 to pivot inwardly between the link 10 or 10a to which it is secured and the crank arm 20 or 24 to which that link is operatively connected. The catch finger is provided with a plurality of upstanding teeth 66 adapted to mesh with the teeth 36 on the side of the member portion 34 when the catch finger 52 is pivoted inwardly by the spring 60. When this meshing interengagement takes place, it will be seen that the assembly 28 is retained against sliding within the slot 44. The size and location of the teeth 36 and 66 are so related that the teeth 66 will fit between the teeth 36 when the member 28 is either at one end or the other of the slot 44.

Each crank arm 20 and 24 is provided with a cam or projection 68, here shown as arcuate in shape, which extends up into the space between that crank arm and its corresponding connecting link and is engageable with the inner side edge of the catch finger 52 as the crank arm 20 rotates, so as to force the catch finger 52 to pivot outwardly against the action of the spring 60, thus causing disengagement between the teeth 66 and 36 during a part of the cycle of rotation of the crank arm, which part preferably does not substantially exceed more than 180 degrees of the rotation of the crank arm.

The mode of operation of the instant device can best be appreciated through a comparison of Figs. 4 and 8–12. Assume that operation of the motor 14 in a direction to cause the wiper blades 2 to pivot through their normal arc is such as to give rise to clockwise rotation of the crank arm 20, as indicated by the arrows 70, Figs. 8–12 illustrate only the action of crank arm 20 and connecting link 10, thus corresponding to Fig. 4. The interaction between the parts connecting crank arm 24 and connecting link 10a will be comparable. Start with the relative positions of the crank arm 20 and connecting link 10 shown in Fig. 8. There the cam 68 is not engaged with the catch finger 52, that finger is moved by the spring 60 so that the teeth 66 and 36 engage, and assembly 28 is at the extreme left hand end of the slot 44. Further rotation of the crank arm 20 will tend to pull the assembly 28 toward the right hand end of the slot 44, but since the assembly cannot slide within the slot because the teeth 66 and 36 are engaged, the link 10 will be pulled to the right until the parts assume the position shown in Fig. 4.

At this point the cam 68 engages the inner edge of the catch finger 52, and continued rotation of the crank arm 20 to the position shown in Fig. 9 causes the catch finger 52 to be forced out against the action of the spring 60 so as to disengage the teeth 66 and 36. However, during this portion of the cycle of operation the pin 22 which passes through the central aperture 30 of the assembly 28 tends to force that assembly toward the extreme left hand end of the slot 44. The assembly 28 is already in that position, and consequently no relative movement between the assembly 28 and the link 10 will take place despite the fact that the teeth 66 and 36 are disengaged. Therefore the transmission from the motor 14 to the connecting link 10 will be accomplished without any lost motion.

Figure 4:
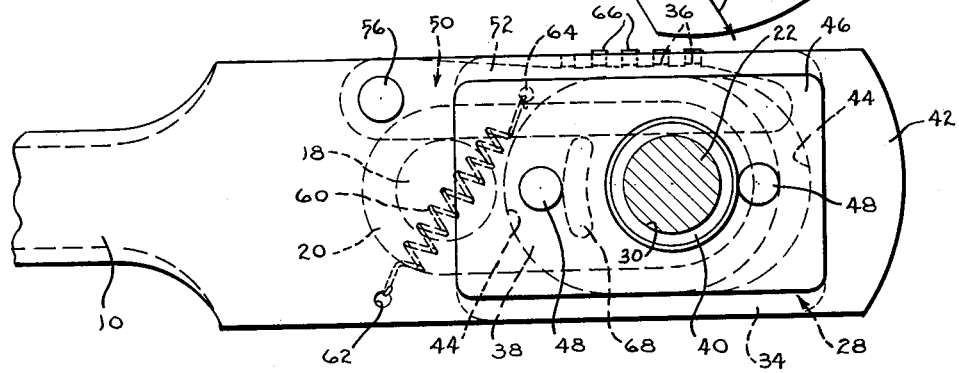
Fig. 4 is a top plan view taken along the line 4—4 of Fig. 2.
Figure 2:
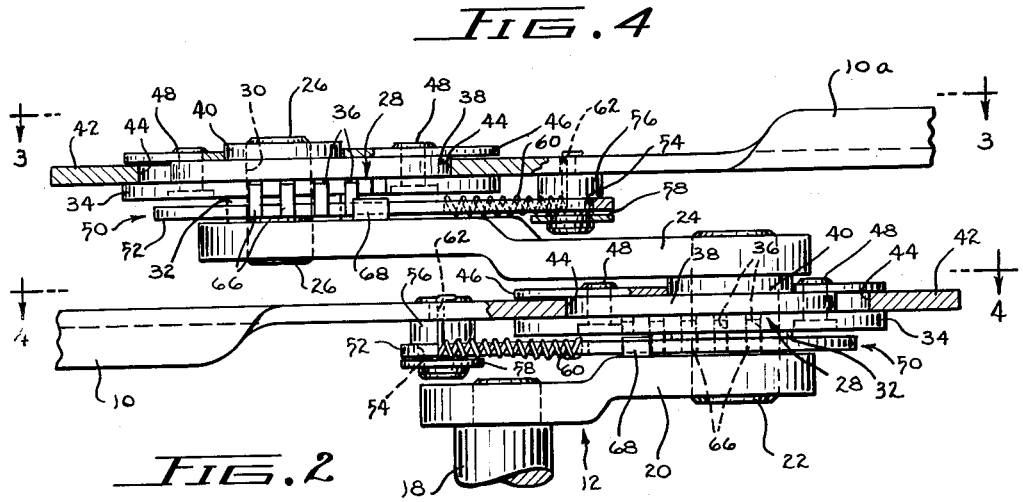
Fig. 2 is a side elevational view, partially broken away and cross sectioned, of the crank assembly part of the windshield wiper driving linkage.

This condition will continue until the parts reach the position shown in Fig. 10, representing a rotation of substantially 180 degrees from the position shown in Fig. 4, at which time the cam 68 will be withdrawn from the catch finger 52, the spring 60 will cause the catch finger 52 to swing in until the teeth 66 and 36 engage, and during the ensuing 180 degrees of rotation of the crank arm 20, when the forces exerted on the assembly 28 by the pin 22 tend to cause that assembly to move toward the extreme right hand end of the slot 44, the assembly 28 will be locked against movement.

If now the direction of rotation of the motor 14 be reversed for parking the blades, the crank arm 20 will be rotated in a counter-clockwise direction in the direction of the arrows 72 of Figs. 11 and 12. Assume that this takes place at a point in the cycle of operation some place between that shown at Fig. 10 and that shown in Fig. 4. During the first portion of this reversal the teeth 66 and 36 will be engaged, and consequently the assembly 28 will remain in its position all the way to the left in slot 44. However, when the position of Fig. 11 is reached, the cam 68 will force the catch finger 52 outwardly, disengaging the teeth 66 and 36 and permitting the assembly 28 to slide within the slot 44. At this time, and with the direction of movement of the crank arm 20 and relative position of the crank arm 20 and link 10 as shown, the force exerted by the pin 22 on the assembly 28 will urge it to slide to the extreme right hand end of the slot 44. Since the teeth 36 and 66 are disengaged, the assembly 28 moves to this extreme right hand position. Counter-clockwise rotation of the crank arm 20 continues to a position approximately 180 degrees removed from the relative position shown in Fig. 10, at which time the cam 68 becomes disengaged from the catch finger 52 and the teeth 66 again engage with the teeth 36, thus retaining the assembly 28 in its new position at the right hand end of the slot 44 despite the fact that the pin 22 tends to displace it therefrom.

When the crank arm 20 reaches the position shown in Fig. 12 the link 10 will be moved as far to the left as it will go, and consequently the wiper blade 2 connected thereto will be in its most depressed position. By comparison of Figs. 10 and 12 it will be seen that the link 10 in Fig. 12 is farther to the left than the link 10 in Fig. 10, this distance being designated 74. This occurs because the assembly 28 is now at the right hand end of the slot 44, thus, in effect, increasing the length of the link 10. Because the link 10 is farther to the left in Fig. 12 when compared with Fig. 10, the blade 2 to which it is operatively connected will be moved to a lower position than was the case during the operation of the motor during normal direction. Thus a depressed parking action is achieved. The direction- and position-sensitive control instrumentality in the housing 16 will stop the motor at this point.

When operation of the wiper is resumed in a normal direction, the sequence of operations will follow correspondingly, the assembly 28 taking the first opportunity when it is released from the catch 50 to move back to the left hand end of the slot 44, there to remain during all ensuing operation of the wiper in normal direction.

It will be appreciated from the above that as long as the wiper continues to operate in one direction or the other, the assembly 28 will remain in its corresponding position within the slot 44. The only moving part is the catch 50, which will become engaged with and disengaged from the assembly 28 once during each cycle of rotation of the crank arm, engagement occurring during all of the time that the assembly 28 is forced toward the other end of the slot 44 and disengagement occurring only during the time that the assembly 28 is urged into the position which it already assumes. It is only when the direction of rotation of the motor 14 is reversed, and then only once for each reversal, that the assembly 28 actually slides within the slot 44. Thus the wear on the assembly 28 is minimal, and the transmission is to all intents and purposes a direct drive during continued uni-directional operation of the system, the lost motion effect by means of which the effective length of one of the linkage elements is changed taking place only when absolutely necessary. It will further be appreciated that the movement of the assembly 28 from one end of the slot 44 to the other in order to produce a change in effective length of one of the linkage elements occurs in a positive manner and by reason of the normal pulling or pushing forces exerted thereon by reason of its pivotal interconnection with the crank arm.

If the catch 50 should for some reason become stuck in a position in engagement with the assembly 28, or if the cam 68 on the crank arm 20 should break, normal operation of the windshield wiper will not be affected. Only that feature thereof by means of which the length of one of the linkage elements can be changed will be nullified. Thus the wiper blades will continue to operate, either over their normal arcs or over their extended arcs, depending upon the particular position of the assembly 28. If the catch 50 should so malfunction as no longer to operatively engage the assembly 28, then the windshield blades 2 will still be operated uniformly, although not smoothly, the assembly 28 sliding within the slots 44 so as to produce a lost motion within the operating linkage. This situation is not ideal, but the vehicle in which the system is installed would not be immobilized nor forced to operate under dangerous conditions in the event of such malfunction.

It is to be emphasized that because the parts are so simple and sturdy, and because there is no reliance upon the action of friction, it is very unlikely that any malfunctioning of any sort will result, the system of the present invention being particularly noteworthy in this regard. Along the same line, it is significant to note that the parts coact in such a way that there is no criticalness of adjustment involved, nor need the parts be made to excessively close tolerances. Only a minimal number of parts are employed, all are very readily and inexpensively manufactured, they may be very easily assembled, and movement of the parts, with the possible exception of the springs 60, are exceptionally free from wear.

But a single embodiment of the invention has been here disclosed, in which the arrangement is such that it is the length of the connecting link 10 or 10a which is varied in accordance with the direction of rotation of the crank arm. It will be apparent that many variations may be

I claim:

1. A direction-sensitive linkage-lengthening arrangement comprising a rotated element, an operated element, and an operative connection between said elements comprising a member mounted on and slidable with respect to one of said elements to a limited degree, a pivotal connection between said member and said other element, a catch engageable with said member to retain it against sliding, said catch being movable between operative and inoperative positions, and an operative connection between said catch and said other element effective to position said catch in inoperative position, thereby leaving said member free to slide with respect to said one of said elements, during not substantially more than half of the cycle of rotation of said rotated element, the position of said member with respect to one of said elements, and hence the effective length of one of said elements, therefore being determined by the direction of rotation of said rotated element.

2. The arrangement of claim 1, in which said member is mounted on said operated element.

3. The arrangement of claim 1, in which said catch is spring urged to operative position, and in which said other element is provided with a part operatively engageable with said catch to move it to inoperative position during not substantially more than half of the cycle of rotation of said rotated element and operatively disengageable from said catch during the remainder of said cycle, said catch then returning to operative position.

4. The arrangement of claim 3, in which said member and said catch are mounted on said operated element, said rotated element having said part operatively engageable with said catch during rotation thereof.

5. The arrangement of claim 1, in which one of said elements is provided with an elongated slot, said member being received within and slidable along said slot.

6. The arrangement of claim 1, in which said member includes a part extending from said one of said elements toward the other of said elements, thereby at least in part determining the spacing between said elements.

7. The arrangement of claim 6, in which said catch engages the part of said member which extends from one of said elements toward the other, said catch being mounted on said one of said elements so as to at least partially extend between said elements.

8. A direction sensitive linkage lengthening arrangement comprising a rotated element and an operated element, said elements having overlying parts, a member mounted on the overlying part of one of said elements and slidable within limits with respect thereto, a pin on the other of said elements and pivotally connected to said member, a catch articulately mounted on said one of said elements, a spring urging said catch into an operative position engaging said member and holding it against movement relative to said one of said elements, and an operative connection between said catch and said other of said elements effective during not substantially more than half the cycle of rotation of said rotated element to move said catch to inoperative position disengaged from said member, said member then being free to move relative to one of said elements, the position of said member with respect to one of said elements, and hence the effective length of said one of said elements, therefore being determined by the direction of rotation of said rotated element.

9. The arrangement of claim 8, in which said elements are spaced from one another, said member at least in part bridging said space, said operative connection between said connection and said other of said elements comprising a cam projecting from said other of said elements and engageable with and disengageable from the space-bridging part of said catch as said rotated element rotates.

10. The arrangement of claim 9, in which said catch is articulately mounted on said one of said elements so as to move between operative and inoperative positions in a direction substantially perpendicular to the axis of rotation of said rotated element, said cam being operatively engaged with said catch over substantially 180 degrees of rotation of said rotated element.

11. The arrangement of claim 8, in which said member is mounted on said operating element.

12. The arrangement of claim 11, in which said elements are spaced from one another, said member at least in part spanning said space, said operative connection between said catch and said other of said elements comprising a cam projecting from said other of said elements and engageable with and disengageable from the space-bridging part of said catch as said rotated element rotates.

13. The arrangement of claim 11, in which said elements are spaced from one another, said member at least in part bridging said space, said operative connection between said connection and said other of said elements comprising a cam projecting from said other of said elements and engageable with and disengageable from the space-bridging part of said catch as said rotated element rotates, and in which said catch is articulately mounted on said one of said elements so as to move between operative and inoperative positions in a direction substantially perpendicular to the axis of rotation of said rotated element, said cam being operatively engaged with said catch over substantially 180 degrees of rotation of said rotated element.

14. The arrangement of claim 8, in which one of said elements is provided with an elongated slot, said member being received within and slidable along said slot.

15. The arrangement of claim 8, in which said member includes a part extending from said one of said elements toward the other of said elements, thereby at least in part determining the spacing between said elements.

16. The arrangement of claim 15, in which said catch engages the part of said member which extends from one of said elements toward the other, said catch being mounted on said one of said elements so as to at least partially extend between said elements.

References Cited in the file of this patent

UNITED STATES PATENTS

| | | |
|---|---|---|
| 2,308,212 | Scott-Iversen et al. | Jan. 12, 1943 |

FOREIGN PATENTS

| | | |
|---|---|---|
| 873,802 | Germany | Apr. 16, 1953 |